United States Patent [19]

Dietzel

[11] 3,713,469
[45] Jan. 30, 1973

[54] APPARATUS FOR PREPARING SUGAR CANE

[75] Inventor: Walter Dietzel, Im Roehrfeld, Braunschweig, Germany

[73] Assignee: Braunschweigische Maschinenbauanstalt, Braunschweig, Germany

[22] Filed: Dec. 10, 1970

[21] Appl. No.: 96,909

[30] Foreign Application Priority Data

Dec. 20, 1969 Germany................P 19 63 944.2

[52] U.S. Cl. ...................... 241/200, 241/222, 99/537
[51] Int. Cl. ............................................. B02c 23/02
[58] Field of Search..... 146/119, 118, 116 A, 78, 120

[56] References Cited

UNITED STATES PATENTS

| | | | |
|---|---|---|---|
| 1,735,389 | 11/1929 | Hall | 146/119 |
| 2,070,959 | 2/1937 | Smith | 146/119 X |
| 808,972 | 1/1906 | Crane | 146/118 X |
| 1,507,730 | 9/1924 | Fuller | 146/120 |

OTHER PUBLICATIONS

German Printed Application, F 15421 III/45e Fritzen 1/26/56

Primary Examiner—Andrew R. Juhasz
Assistant Examiner—James F. Coan
Attorney—Arthur O. Klein

[57] ABSTRACT

Apparatus for preparing sugar cane before it is fed to a diffusion plant of the type including a conveyor belt, means for supplying sugar cane to the belt, a device for spreading out the layer of cane on the belt to make it even and a preliminary rotary comminuting cutter mounted above the conveyor belt for cutting up the cane on the belt is provided with a second rotary comminuting cutter mounted above the belt in a position downstream, in the direction of conveyance, of the preliminary cutter and a rotary cane lifting drum which is mounted just upstream of the second rotary cutter and rotates about an axis transverse to the conveyor belt to feed the partly comminuted cane to the second rotary cutter which cuts up the cane into a finely divided state ready for feeding to the diffusion plant.

7 Claims, 2 Drawing Figures

PATENTED JAN 30 1973  3,713,469

INVENTOR:
BY: Walter DIETZEL
Arthur O. Klein
Attorney

APPARATUS FOR PREPARING SUGAR CANE

This invention relates to apparatus for preparing sugar cane before it is fed to a diffusion plant, the apparatus including a conveyor belt, a device for evening out a layer of cane on the conveyor belt and a preliminary rotary comminuting cutter mounted above the conveyor belt.

The conventional technique for the preparation of raw sugar cane is as follows: The raw cane is conveyed on a conveyor belt consisting of plates hinged to each other. The cane is conveyed through what is called an "Equaliser" for evening out the thickness of the layer of can on the belt. Downstream of this the cane passes under a preliminary rotary cutter equipped with a number of cutter blades spaced axially apart at intervals of approximately 65 mm, the cutting depth of the blades being approximately 100 mm. This preliminary rotary cutter is situated above the conveyor belt and consumes power at the rate of approximately 2 metric horse power per metric ton of cane per hour. From the preliminary rotary cutter the cane is fed to a first hammer mill, called the "Buster", consuming about 7 metric horsepower per metric ton of cane per hour; the cane then passes through a second hammer mill, called the "Fibrillator" which consumes about 6 metric horsepower per metric ton of cane per hour. The preparation reduces the size of pieces of cane sufficiently for subsequent treatment in a diffusion plant.

This preparation consumes considerable power, particularly in the two hammer mills. The hammer mills suffer rapid abrasion, resulting in high operating costs and a considerable amount of maintenance.

The object of this invention is to remove these disadvantages, and to provide apparatus for the preparation of sugar cane which consumes less power per metric ton of cane prepared but nevertheless delivers a high throughout of prepared cane efficiently comminuted. The apparatus suffers little from abrasion, and the individual abrading parts are easily replaced.

To this end, according to this invention, in an apparatus for preparing sugar cane before it is fed to a diffusion plant including a conveyor belt, a device for evening out a layer of cane on the conveyor belt and a preliminary rotary comminuting cutter mounted above the conveyor belt, we provide a second rotary comminuting cutter above the conveyor belt in a position downstream, in the direction of conveyance, of the preliminary cutter and a rotary cane lifting drum which rotates about an axis transverse to the conveyor belt is mounted above the conveyor belt just upstream of the second rotary cutter.

The second rotary cutter may rotate in either direction relative to the movement of the belt depending on the degree of comminution required.

According to a further, preferred feature of the invention the second rotary cutter is mounted near the delivery end of the conveyor belt, the cutter in this case rotating so that its blades move counter to the direction of movement of the conveyor belt. This arrangement gives a particularly efficient comminution. In order to utilize power as efficiently as possible the gap between the second cutter and the conveyor belt is smaller than the gap between the preliminary cutter and the conveyor belt.

The peripheral speed of the cane lifting drum is preferably at least 5 percent higher than the linear speed of the conveyor belt. To give the lifting drum a good grip on the cane it is preferably provided with axially extending ribs spaced apart around its periphery.

In order to utilize fully the kinetic energy imparted to the pieces of cane by the second cutter, a number of stationary impact cutter blades may be fixed to the inner surface of a hood which extends over the secondary rotary cutter. The impact blades may have knife or sawtooth edges and the distance by which they project from the hood towards the rotary cutter may be adjustable.

Raw sugar cane passing through the apparatus in accordance with the invention is processed as follows. The cane is first of all comminuted as usual by the preliminary rotary cutter, which cuts into the cane essentially by cutting along the fibers. After the preliminary rotary cutter the cane is conveyed on the conveyor belt until it reaches the rotary cane lifting drum, which lifts the cane and throws it against the adjacent blades of the second rotary cutter. It should be observed that the pieces of cane do not rest on the surface of the conveyor belt during the second cutting operation. On the contrary the cane is comminuted by the second cutter essentially while it is travelling through the air above the surface of the conveyor belt. This method of cutting is more efficient, no energy being lost to the conveyor belt.

The stationary impact cutter blades mounted on the inner surface of the hood above the second rotary cutter prevent any large pieces of cane from being delivered at the outlet of the apparatus. The second rotary cutter can if desired be installed almost anywhere along the conveyor belt downstream of the preliminary cutter and the lifting drum. However it has been found advantageous to locate the second cutter near the delivery end of the belt. If desired the second cutter can be located just beyond the delivery end of the conveyor belt, but in this case the direction of rotation must be counter to the movement of the conveyor belt.

In the apparatus in accordance with the invention the amount of power required for driving the conveyor belt and the preliminary rotary cutter is approximately the same as in the earlier apparatus. On the other hand the second rotary cutter consumes only about 5 metric horsepower per metric ton of cane per hour, compared with the total of 12 to 14 horsepower consumed by the two hammer mills in the conventional apparatus. A further advantage of the apparatus in accordance with the invention is that it is much easier to replace the individual cutter blades of the second rotary cutter, than it is to replace the hammer heads in the hammer mills, which are subject to very high abrasion.

Two examples of apparatus in accordance with the invention are illustrated diagrammatically in the accompanying drawings in which.

Figure 1:
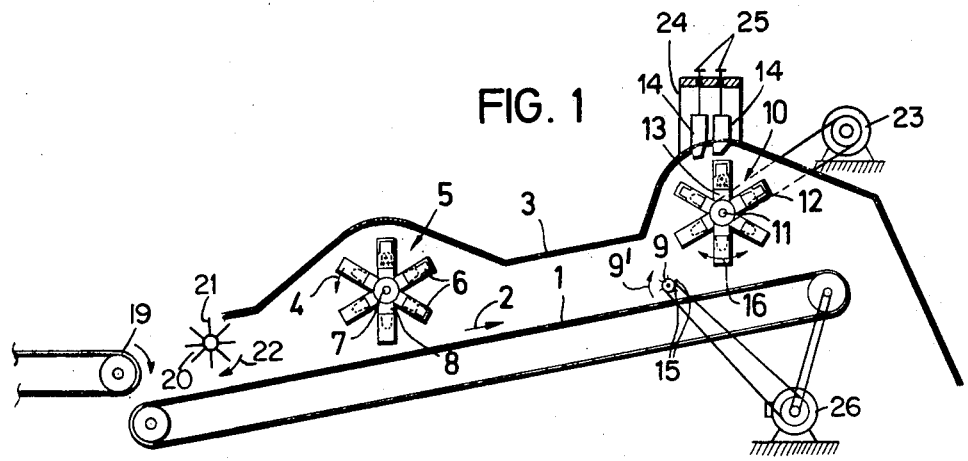
FIG. 1 is a side view of one example.

In both examples there is a conveyor belt 1 which slopes slightly upwards in the direction of conveyance. The conveyor belt delivers comminuted sugar cane to a diffusion plant. The conveyor belt 1 receives the can from a feeding conveyor 19 and conveys in the direction of an arrow 2. The conveyor belt 1 is enclosed from above by a hood or housing 3. Near the upstream or inlet end of the belt, under the housing 3, there is a device 20, for example a rotating roller, which is equipped with fingers 21 and rotates in the direction of arrow 22 for evening out the thickness of the layer of cane on the belt. Downstream of this device the cane reaches a preliminary rotary comminuting cutter 5, which rotates in the direction indicated by a small arrow 4. The preliminary cutter 5 has, around its periphery, a number of cutter blades 6 spaced axially apart a uniform distance from each other. Each cutter blade 6 is supported by a radially projecting arm 8, which projects radially outwards from an axle 7 of the rotary cutter 5. The cutter blades 6 are spaced axially apart by gaps of about 50 mm. The blades cut into the layer of cane on the conveyor for a cutting depth of approximately 100 mm. Each blade is mounted on its arm 8 so that the blade can easily be replaced. The preliminary rotary cutter 5 consumes a power of approximately 2 metric horsepower per metric ton of cane per hour.

After being comminuted to some extent by the preliminary rotary cutter 5, the cane is conveyed by the conveyor 1 to a rotary cane lifting drum 9, which rotates in the direction indicated by a small arrow 9'. The cane lifting drum 9 is situated just upstream of and close to a second rotary cutter 10. The gap between the belt 1 and the cutter 10 is smaller than that between the belt and the preliminary cutter 5. The cutter 10 rotates on an axle 11 which extends across the conveyor belt and rotates in bearings in the side walls of the hood 3. The cutter 10 also has, distributed around its periphery, a number of rows of cutter blades 12, the rows of blades being spaced apart axially. Each cutter blade is mounted on a radial supporting arm 13. Between the outer ends of the cutter blades 12 and the surface of the conveyor belt there is a gap preferably 30 mm wide. The rotary cutter 10 is driven at a speed which can be varied to give a peripheral speed, anywhere between 40 and 60 meters per second for example by means of electric motor 23. The cutter blades 12 are mounted on the supporting arms 13 in such a way that they are easily replaceable.

The rotary cane lifting drum 9, is driven, for example by means of electric motor 26 to provide it with a peripheral speed at least 5 percent greater than the linear speed of the conveyor belt. The rotary cutter 10 consumes power at the rate of approximately 5 metric horsepower per metric ton of cane per hour.

Fixed to the inner surface of the hood 3 above the rotary cutter 10 there are arranged a number of knife-edged or saw-tooth-edged stationary, i.e., non-rotating impact blades 14 the effective depth of which, that is to say the distance by which they project downwards from the inner surface of the hood towards the cutter 10, is adjustable by means of guide ways 24 and set screws 25. The cane lifting drum 9 has spaced apart around its periphery a number of axially extending ribs 15.

The rotary cutter 10, with its upstream cane lifting drum 9, can be installed at any position desired along the conveyor belt 1 downstream of the preliminary rotary cutter 5. However it has been found advantageous to instal these two parts near the delivery end of the conveyor belt 1, to facilitate ejection of the comminuted cane.

In the example shown in FIG. 1, the rotary cutter 10, with its upstream cane lifting drum 9, is mounted near the delivery end of the conveyor belt 1, but over the belt. The drive for the rotary cutter 10 or its motor 23 is reversible, that is to say the cutter 10 can be driven to rotate in either direction as indicated by a small double arrow 16, rotating either with or counter to the movement of the conveyor belt 1.

Figure 2:
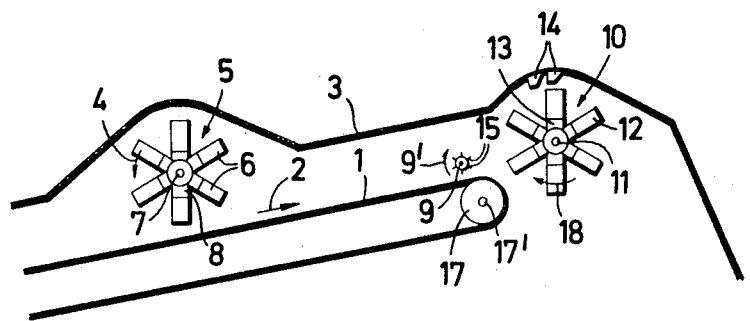
FIG. 2 is a similar view of the second example.

In the example shown in FIG. 2, the rotary cutter 10 is mounted above but beyond the delivery end of the conveyor belt 1, that is to say the axle 11 of the rotary cutter 10 is beyond an axis 17' of a delivery end belt roller 17 of the belt conveyor 1. The cane lifting drum 9 is situated close to the rotary cutter 10 and close to the conveyor belt roller 17. In this case the second rotary cutter 10 rotates in the direction indicated by a small arrow 18 in FIG. 2, so that the outer end of each blade, when adjacent the belt 1 travels in a direction counter to the direction of conveyance of the belt.

The cane leaving the preliminary rotary cutter 5 on the conveyor belt 1 and reaching the second rotary cutter 10, which rotates at a higher speed, is comminuted so effectively that the product can be fed directly to the diffusion plant, no hammer mills being necessary. The individual cutter blades 12 mounted on the supporting arms 13 can easily be removed and replaced. The fact that no hammer mills are required, since the rotary cutter 10 by itself produces an extremely effective comminution of the cane, ensures that the entire apparatus consumes comparatively little power. Maintenance is also considerably reduced, compared with the conventional apparatus which includes two hammer mills.

Although the invention is illustrated and described with reference to a plurality of embodiments, it is to be expressly understood that it is in no way limited to the disclosure of such a plurality of embodiments, but is capable of numerous modifications within the scope of the appended claims.

I claim:

1. In apparatus for preparing sugar cane before feeding said cane to a diffusion plant, said apparatus including a conveyor belt, means driving said conveyor belt, means for feeding a layer of sugar cane to said belt, a device for making said layer of cane on said conveyor belt of even thickness, a preliminary rotary comminuting cutter and means mounting said cutter above said belt, the improvement comprising a second rotary comminuting cutter, means mounting said second cutter above said belt in a position spaced along said belt in the direction of conveyance thereof from said preliminary cutter, a rotary cane lifting drum, and means mounting said drum for rotation about an axis transverse to said direction of conveyance in a position above said belt adjacent said second cutter and on the same side thereof as said preliminary cutter.

2. Apparatus as claimed in claim 1, further comprising reversible means for rotating said second cutter selectively in either one of two directions whereby the part of said second cutter adjacent said belt moves either in the same direction as or counter to said direction of conveyance.

3. Apparatus as claimed in claim 1, wherein said second cutter is mounted adjacent said belt at the delivery end thereof and further comprising means rotating said second cutter whereby the part of said cutter adjacent said belt moves counter to said direction of conveyance.

4. Apparatus as claimed in claim 1, wherein said means mounting said preliminary cutter mount said cutter spaced from said belt by a first distance and said means mounting said second cutter mount said second cutter spaced from said belt by a second distance, said second distance being smaller than said first distance.

5. Apparatus as claimed in claim 1, wherein said means driving said conveyor belt drives said belt at a linear first speed and further comprising means for rotating said cane lifting drum at a peripheral second speed, said second speed being at least 5 percent higher than said first speed.

6. Apparatus as claimed in claim 1, further comprising axially extending and circumferentially spaced apart ribs on the periphery of said cane lifting drum.

7. Apparatus as claimed in claim 1, further comprising a stationary hood extending over said second cutter, a number of stationary impact cutter blades, means mounting said stationary impact cutter blades on said hood for projecting therefrom towards said second cutter and means for adjusting said mounting means whereby the distance by which said stationary impact cutter blades project from said hood towards said second cutter is adjustable.

* * * * *